United States Patent
Lacroix et al.

(10) Patent No.: US 9,202,354 B2
(45) Date of Patent: *Dec. 1, 2015

(54) ECCENTRIC ROTATING MASS ACTUATOR OPTIMIZATION FOR HAPTIC EFFECTS

(71) Applicant: Immersion Corporation, San Jose, CA (US)

(72) Inventors: Robert A. Lacroix, San Jose, CA (US); Michael A. Greenish, Gryon (CH); Erin B. Ramsay, Dollard-des-Ormeaux (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,605

(22) Filed: Jun. 25, 2014

(65) Prior Publication Data

US 2014/0327530 A1 Nov. 6, 2014

Related U.S. Application Data

(63) Continuation of application No. 13/755,423, filed on Jan. 31, 2013, now Pat. No. 8,791,799.

(60) Provisional application No. 61/593,719, filed on Feb. 1, 2012.

(51) Int. Cl.
| | |
|---|---|
| *H04B 3/36* | (2006.01) |
| *G08B 6/00* | (2006.01) |
| *G06F 3/01* | (2006.01) |
| *H04M 19/04* | (2006.01) |

(52) U.S. Cl.
CPC *G08B 6/00* (2013.01); *G06F 3/016* (2013.01); *H04M 19/047* (2013.01)

(58) Field of Classification Search
CPC ......... G06F 3/016; G08B 6/00; H04M 19/047
USPC ........... 340/407.1, 407.2, 540, 541, 506, 635; 345/156, 158, 161, 163
See application file for complete search history.

(56) References Cited

U.S. PATENT DOCUMENTS

| | | | | |
|---|---|---|---|---|
| 5,436,622 | A * | 7/1995 | Gutman et al. | 340/7.6 |
| 7,798,982 | B2 * | 9/2010 | Zets et al. | 601/78 |
| 7,843,277 | B2 | 11/2010 | Gregorio et al. | |
| 2003/0025595 | A1 | 2/2003 | Langberg | |
| 2009/0295552 | A1 * | 12/2009 | Shahoian et al. | 340/407.1 |
| 2011/0115754 | A1 | 5/2011 | Cruz-Hernandez | |
| 2014/0089792 | A1 | 3/2014 | Ramsay et al. | |

FOREIGN PATENT DOCUMENTS

GB  2350698 A  12/2000

* cited by examiner

*Primary Examiner* — Tai T Nguyen
(74) *Attorney, Agent, or Firm* — Miles & Stockbridge, P.C.

(57) ABSTRACT

A system that generates a haptic effect using an Eccentric Rotating Mass ("ERM") actuator determines a vibration level of the device during operation of the device. The system receives a haptic effect signal including one or more parameters, where one of the parameters is a voltage amplitude level as a function of time. The system varies the voltage amplitude level based at least on vibration level and applies the varied haptic effect signal to the ERM actuator.

28 Claims, 7 Drawing Sheets

ECCENTRIC ROTATING MASS ACTUATOR OPTIMIZATION FOR HAPTIC EFFECTS

CROSS REFERENCE TO RELATED APPLICATIONS

This application is a continuation application of U.S. patent application Ser. No. 13/755,423, filed Jan. 31, 2013, now U.S. Pat. No. 8,791,799, which claims priority of U.S. Provisional Patent Application Ser. No. 61/593,719, filed on Feb. 1, 2012, the contents of each which is hereby incorporated by reference.

FIELD

One embodiment is directed to an actuator, and in particular to an actuator used to generate haptic effects.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator. Known actuators used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Many of these actuators, and the devices that they interact with, have built-in resonant frequencies that optimally are dynamically determined and controlled so that drive signals that generate the haptic effects can be most effective and efficient, such as the optimization of an LRA device as disclosed in U.S. Pat. No. 7,843,277.

The performance characteristics of an actuator such as the rise time, brake time, and steady state voltage, may vary based on the design and manufacturer of the actuator, and may also change during the life of the actuator because of physical shocks, temperature fluctuations, fatigue, and wear and tear. Further, device manufacturers want the freedom to substitute different actuators at will based on cost, availability and performance characteristics without adversely affecting the haptic feedback provided by the device or requiring costly reconfiguration by hand.

SUMMARY

One embodiment is a system that generates a haptic effect using an Eccentric Rotating Mass ("ERM") actuator. The system determines a vibration level of the device during operation of the device. The system receives a haptic effect signal including one or more parameters, where one of the parameters is a voltage amplitude level as a function of time. The system varies the voltage amplitude level based at least on vibration level and applies the varied haptic effect signal to the ERM actuator.

DETAILED DESCRIPTION

One embodiment is a system the generates haptic effects using an Eccentric Rotating Mass ("ERM") actuator. The system characterizes the ERM actuator using back electromotive force ("EMF") in order to derive operating parameters, including rise time, brake time, and revolutions per minute discrepancies. The operating parameters are then used by a controller in generating haptic effect signals in order to optimize the behavior of the system.

Figure 1:
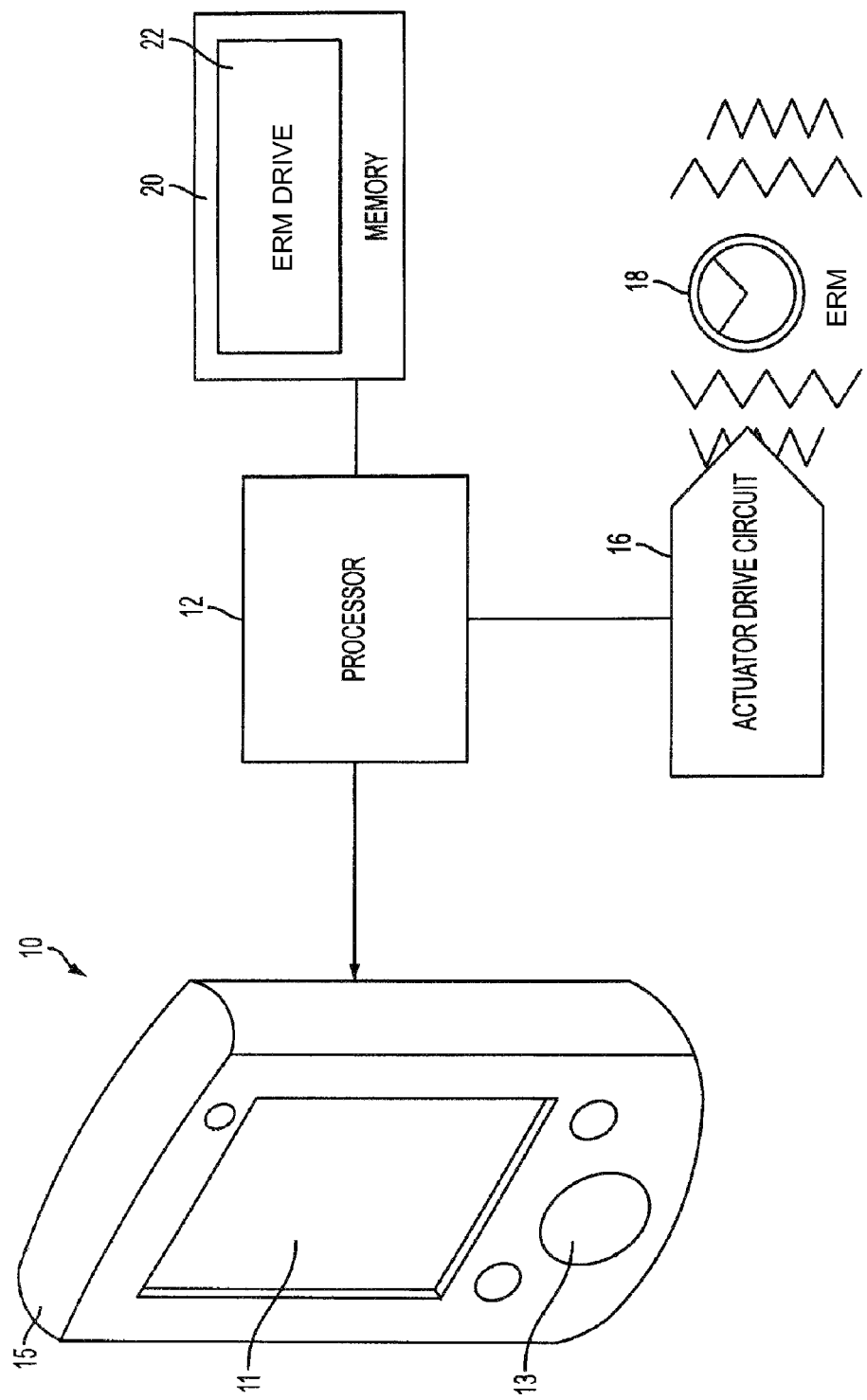
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor or controller 12. Coupled to processor 12 is a memory 20 and an actuator drive circuit 16, which is coupled to an ERM actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply ERM 18 with the required electrical current and voltage (i.e., "motor signals") to cause the desired haptic effects. System 10 may include more than one ERM 18, and each ERM may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes an ERM drive module 22 which are instructions that, when executed by processor 12, generate drive signals for ERM 18 while also using the back EMF from ERM 18 to adjusting the drive signals, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, etc., or may be any other type of device that provides a user interface and includes a haptic effect system that includes one or more ERM actuators. The user interface may be a touch sensitive surface, or can be any other type of user interface such as a mouse, touchpad, mini-joystick, scroll wheel, trackball, game pads or game controllers, etc. In embodiments with more than one ERM, each ERM may have a different rotational capability in order to create a wide range of haptic effects on the device. System 10 may also include one or more sensors. In one embodiment, one of the sensors is an accelerometer (not shown) that measures the acceleration of ERM 18 and system 10.

Figure 2:
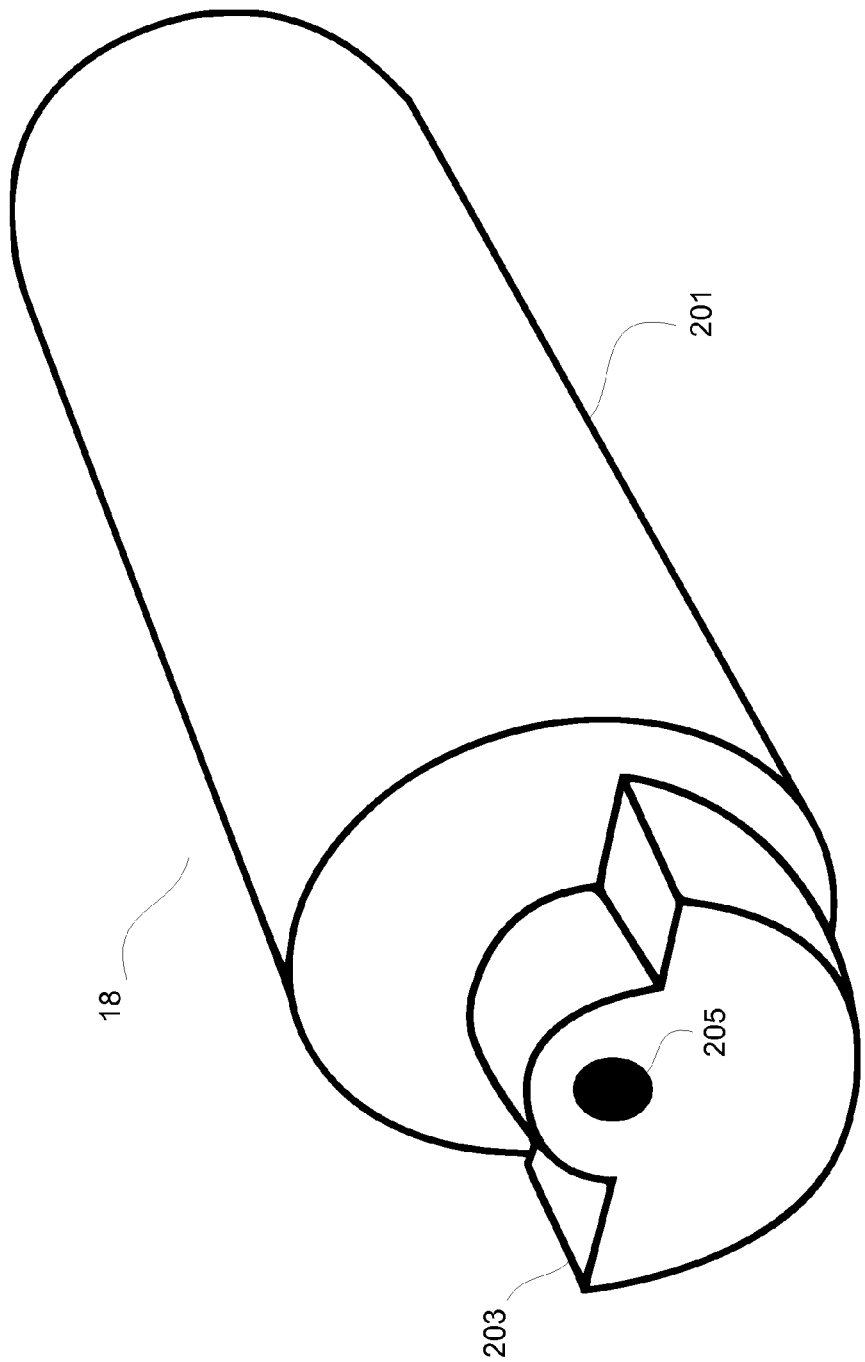
FIG. 2 is a cut-away partial perspective view of the ERM of FIG. 1 in accordance with one embodiment of the present invention.

FIG. 2 is a cut-away partial perspective view of ERM 18 of FIG. 1 in accordance with one embodiment of the present invention. ERM 18 includes a rotating mass 201 having an off-center weight 203 that rotates about an axis of rotation 205. In operation, any type of motor may be coupled to ERM 18 to cause rotation in one or both directions around axis of rotation 205 in response to the amount and polarity of voltage applied to the motor across two leads of the motor (not shown in FIG. 2). It will be recognized that an application of voltage in the same direction of rotation will have an acceleration effect and cause the ERM 18 to increase its rotational speed, and that an application of voltage in the opposite direction of rotation will have a braking effect and cause the ERM 18 to decrease or even reverse its rotational speed.

One embodiment of the present invention determines the angular speed of ERM 18 during a monitoring period of a drive signal. Angular speed is a scalar measure of rotation rate, and represents the magnitude of the vector quantity angular velocity. Angular speed or frequency ω, in radians per second, correlates to frequency ν in cycles per second, also called Hz, by a factor of 2π. The drive signal applied to ERM 18 by drive circuit 16 of FIG. 1 includes a drive period where at least one drive pulse is applied to ERM 18, and a monitoring period where the back EMF (also referred to as the "counter-electromotive force" ("CEMF")) of the rotating mass 201 is received and used to determine the angular speed of ERM 18. In another embodiment, the drive period and the monitoring period are concurrent and the present invention dynamically determines the angular speed of ERM 18 during both the drive and monitoring periods.

Figure 3:
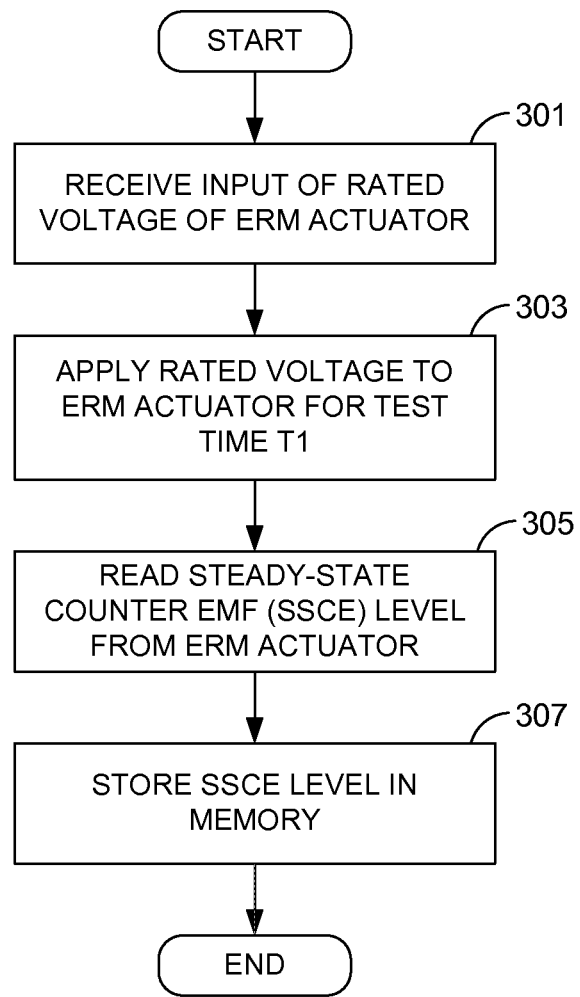
FIG. 3 is a flow diagram of the functionality of the ERM drive module of FIG. 1 to determine a steady-state counter EMF ("SSCE") level of the ERM in accordance with one embodiment of the present invention.

FIG. 3 is a flow diagram of the functionality of ERM drive module 22 to determine a steady-state counter EMF ("SSCE") level of ERM 18 in accordance with one embodiment of the present invention. The SSCE is a back EMF target to be achieved for substantially maximum force and can be considered a subset of all back EMFs that can be measured. In one embodiment, the functionality of the flow diagram of FIG. 3, and FIGS. 4-7 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 301, module 22 receives or is otherwise provided with the rated voltage of ERM 18. The rated voltage or standard voltage is the operating voltage level recommended by the manufacturer of ERM 18. In one embodiment, the rated voltage level is 3 volts. The rated voltage may be determined by any means, including but not limited to automatic detection by the system, encoding in a non-volatile memory or input by hand from a manufacturer or end user.

At 303, the rated voltage is applied to ERM 18 for a test time of T1. The rated voltage may be applied either continuously or in one or more pulses. Test time T1 may be automatically determined, encoded in non-volatile memory, or input by hand, but should be long enough to enable ERM 18 to achieve a steady-state angular speed given the applied rated voltage. Typical values for test time T1 may range between 200 ms and 1000 ms.

Once ERM 18 has achieved a steady-state angular speed, at 305 the value of ERM 18 steady-state counter EMF ("SSCE") is measured during the monitoring period, and at 307 the SSCE value is stored in memory as a status signal.

Figure 4:
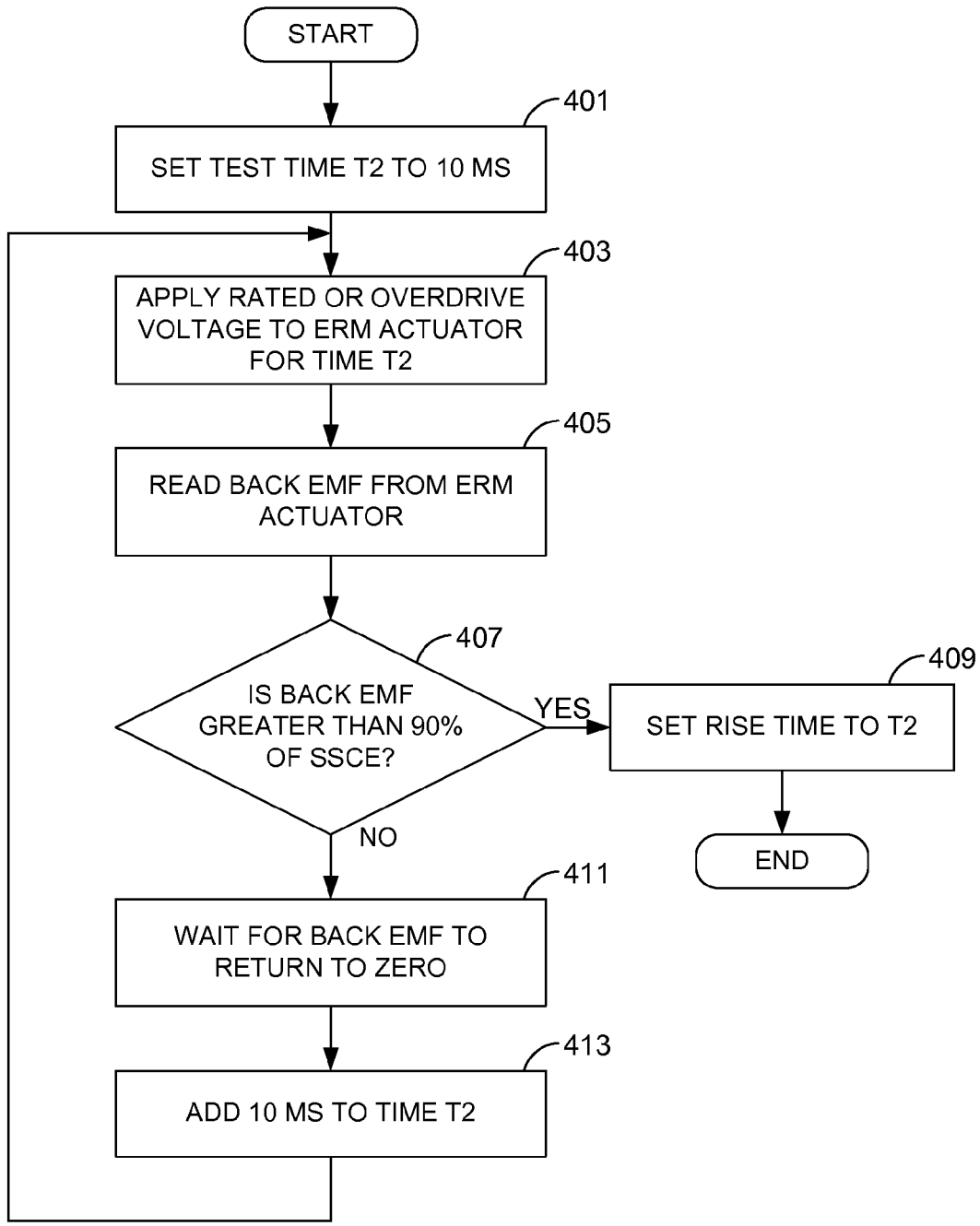
FIG. 4 is a flow diagram of the functionality of the ERM drive module to determine a rise time of the ERM in accordance with one embodiment of the present invention.

FIG. 4 is a flow diagram of the functionality of ERM drive module 22 to determine a rise time of ERM 18 in accordance with one embodiment of the present invention. In one embodiment, the functionality of FIG. 4 is not initiated after the functionality of FIG. 3 until the back EMF returns to zero as the ERM spools down.

At 401, a test time T2 is set to a low initial value, such as 10 ms, but the initial value for T2 may be any value which is likely to be less than the rise time for ERM 18.

At 403, the rated or an overdrive voltage is applied to ERM 18 for time T2. The overdrive voltage is a voltage level that is higher than the rated voltage for ERM 18. In one embodiment, the overdrive voltage level is 5 volts. In embodiments where an overdrive voltage is used with ERM 18 during operations, the overdrive voltage is applied at 403. The benefits of using an overdrive voltage during operation of system 10 is a greater dynamic range of haptic effects and a faster response time (spool up and spool down). If overdrive voltage is not used, the rated voltage is applied at 403.

At 405, the back EMF is read from ERM 18 as a status signal.

At 407, if the back EMF is greater than a rise time upper threshold value, such as 90% of the SSCE determined in FIG. 3, then at 409 the rise time is set to the value of T2. Typically, the rise time determined at 409 is shorter when overdrive voltage is used at 403 as opposed to rated voltage.

Otherwise, at 411 the system waits for the back EMF of ERM 18 to return to zero, and at 413 an incremental rise time value, such as 10 ms, is added to T2. Functionality then continues at 403. The rise time upper threshold value may be any value, but typical values may range between 90% and 110% of the rated voltage SSCE. The incremental rise time value may also be any value, but typical values may range between 10 ms and 60 ms, but can be up to 200 ms for slow, high inertia motors.

Figure 5:
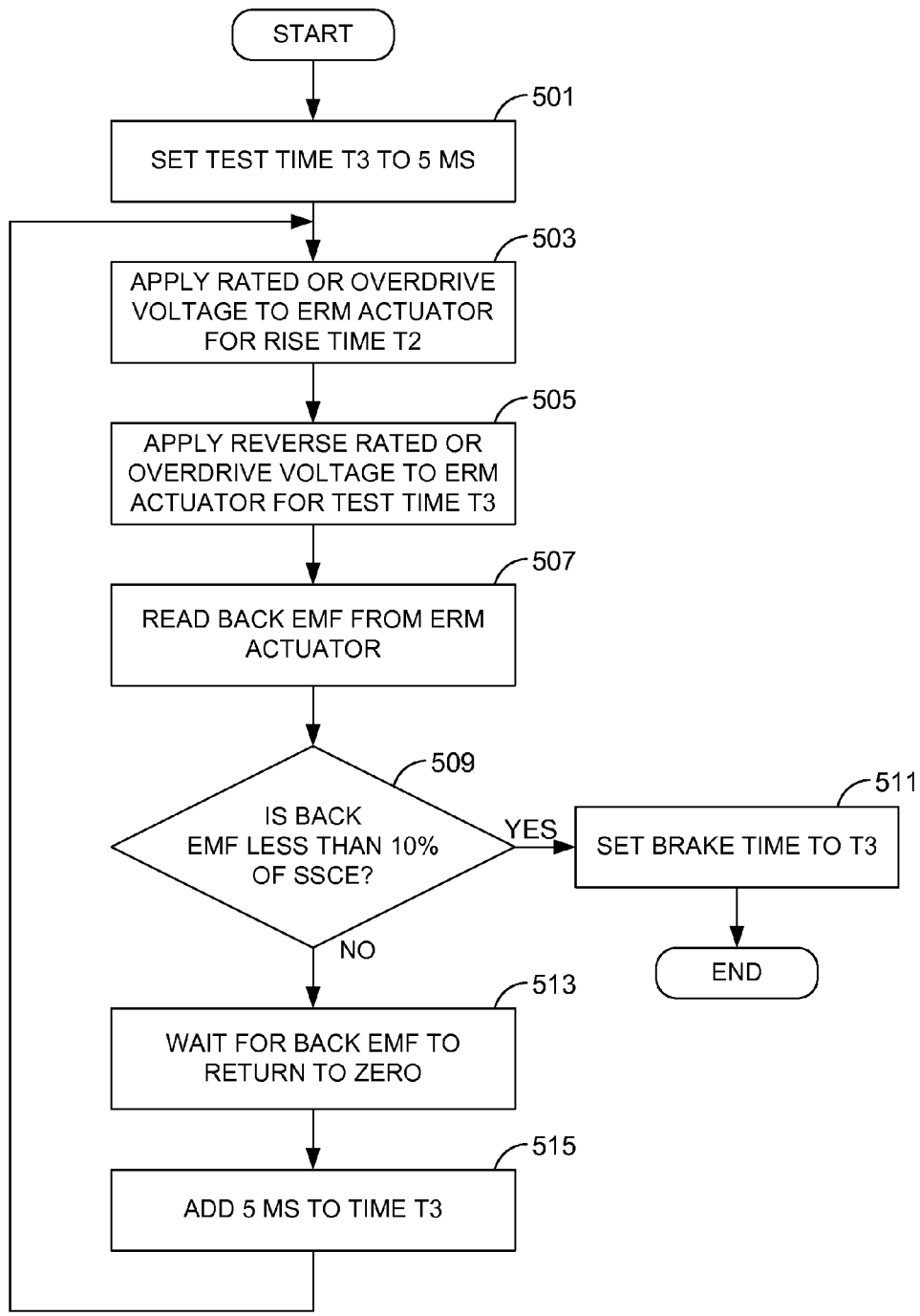
FIG. 5 is a flow diagram of the functionality of the ERM drive module to determine a brake time of the ERM in accordance with one embodiment of the present invention.

FIG. 5 is a flow diagram of the functionality of ERM drive module 22 to determine a brake time of ERM 18 in accordance with one embodiment of the present invention.

At 501, a test time T3 is set to a low initial value, such as 5 ms, but the initial value for T3 may be any value which is likely to be less than the brake time for ERM 18.

At 503, the rated or overdrive voltage is applied to ERM 18 for at least rise time T2. If using the rated voltage, there is no typical limit on how long the voltage can be applied. If using overdrive voltage, the voltage in one embodiment is applied for approximately the rise time T2 and not much longer. The purpose when applying overdrive voltage is to get the actuator into a target acceleration voltage spin once it has achieved equilibrium.

At 505, the full reverse overdrive voltage is applied to ERM 18 for test time T3 (if using overdrive voltage during operation of system 10) or otherwise the full reverse rated voltage is applied for test time T3.

At 507, the back EMF is read from ERM 18 as a status signal. At 509, if the back EMF is less than a brake time lower threshold value, such as 10% of the SSCE, then at 511 the brake time is set to the value of T3. Otherwise, at 513 the system waits for the back EMF of ERM 18 to return to zero, and at 515 an incremental brake time value, such as 5 ms, is added to T3. The functionality then continues to 503. The brake time lower threshold value may be any value, but typical values may range between 0% and 20% of the SSCE. The incremental brake time value may also be any value, but typical values may range between 5 ms and 40 ms for embodiments of system 10 that use overdrive voltage during operations.

As a result of the functionality of FIGS. 3-5, the rise time and brake time of ERM 18 is derived. In one embodiment, the functionality of FIGS. 3-5 is performed in conjunction with the manufacture of system 10 using test bench measurements. In another embodiment, the functionality of FIGS. 3-5 is performed "on-board" system 10 such as whenever system 10 is powered on. In another embodiment, an accelerometer of system 10 can be used to read vibration level and this parameter can be used instead of back EMF or in conjunction with the back EMF value to continuously correct and improve the model throughout the lifetime of the device by measuring real data points.

In one embodiment, the derived values for back EMF, rise time, and brake time are used to vary a haptic signal by linking the targeted back EMF levels to vibration/acceleration levels. The following pseudo-code in one embodiment can be used for the linking:

```
if(vibrating)
   if current_acceleration_backemf >= target.acceleration-backemf
   then stop.overdrive and set voltage to target
   elseif(braking)
   if current_acceleration_backemf == 0
   then stop braking and cut voltage
```

The following is an example of the use of a derived ERM rise time and brake time to provide more precise haptic effects when overdrive voltage is used. Assume that an ERM device such as ERM 18 has a rated voltage rise time of 40 ms and a decay time of 40 ms, an overdrive rise time of 30 ms, a reverse overdrive brake time of 20 ms, and that a device application must provide a single continuous 50 ms haptic effect to a user. If the device application simply instructs the system to provide a 50 ms rated voltage to the ERM, for the first 40 ms the haptic effect is less than maximum, for the next 10 ms the haptic effect is at maximum, and then for the next 40 ms the haptic effect will continue while the ERM angular speed returns to zero.

With an embodiment of the present invention, the single 50 ms voltage is converted to three separate voltages: first, an overdrive voltage is applied to the ERM for the overdrive rise time of 30 ms, second, a rated voltage is applied to the ERM for the 20 ms remaining time of the haptic effect, and third, a reverse overdrive voltage is applied to the ERM for the overdrive brake time of 20 ms. With this example, the resulting haptic effect reaches maximum 10 ms sooner and returns to zero 20 ms sooner than without using the present invention, providing a more precise and therefore more compelling haptic experience to the user.

In another example, a target acceleration can be a "low rumble", such as 30% of rated voltage steady state back EMF. For a non-overdrive capable system, the "overdrive portion" would instead use substantially the maximum rated voltage to speed up the rise time to the 30% strength level. For braking, both a non-overdrive and overdrive system would use the substantially maximum available voltage in order to stop the motor quickly.

Embodiments disclosed above control the ERM when generating haptic effects based on time varying control of the voltage across the motor. However, the actual motor speed is affected by many varying factors such as brush and bearing friction, solder joint resistance, etc. As a result, because of manufacturing tolerances, the "same" ERM motors, when controlled at a given voltage, turn at different rates, and subsequently so does the acceleration generated by each motor. Controlling haptic strength only through voltage feedback is therefore not ideal because of variance in the production of the motor.

In one embodiment, to compensate for ERM variances, the ERM is controlled based on its instantaneous speed. The speed of the ERM is proportional to the back EMF of the ERM (which is measured as disclosed in FIGS. 3-5 above) and can be measured instantaneously using various methods. Using the instantaneous motor speed, the voltage across the ERM can be adjusted so that the motor is always turning at the desired speed. Then, a time varying speed profile can be used to define a haptic effect rather than a time varying voltage profile.

Figure 6:
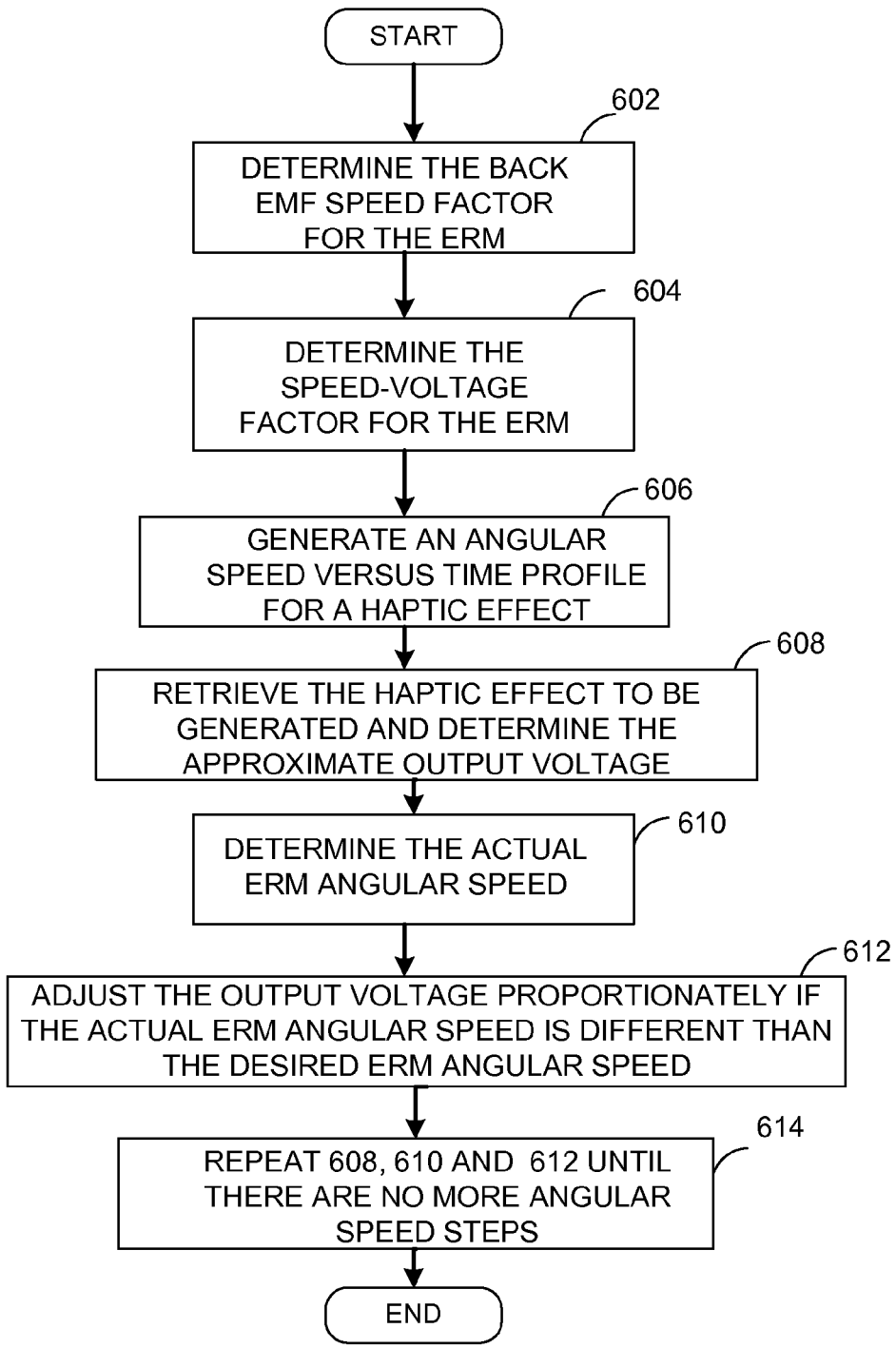
FIG. 6 is a flow diagram of the functionality of the ERM drive module when using back EMF to adjust the speed of the ERM in accordance with one embodiment of the present invention.

FIG. 6 is a flow diagram of the functionality of ERM drive module 22 when using back EMF to adjust the speed of ERM 18 in accordance with one embodiment of the present invention.

At 602, the back EMF speed factor for the ERM is determined. To characterize the relationship between the back EMF to angular speed of ERM 18, the back EMF of ERM 18 is sampled at various RPMs. In one embodiment, the sampling occurs before installation of ERM 18 into system 10 using an accelerometer to measure acceleration frequency, which represents the angular speed (or with other measurement tools) and a voltmeter to measure back EMF. In other embodiments, the measurements can be made onboard.

At 604, the speed-voltage factor for ERM 18 is determined. To characterize the relationship between output voltage and angular speed, the angular speed of the motor is sampled at various output voltages. As with 602, in one embodiment the functionality of 604 can be completed before installation of ERM 18 into system 10 using an accelerometer to measure acceleration frequency, which represents the angular speed (or with other measurement tools) and a voltmeter to measure back EMF.

At 606, based on the measurements at 602 and 604, an angular speed versus time profile for a haptic effect generated by ERM 18 is generated or retrieved if previously generated when a haptic effect is to be played by processor 12.

At 608, the haptic effect to be generated is retrieved, and the approximate output voltage is determined using the angular speed versus time profile from 606.

At 610, the actual ERM angular speed is determined by applying a voltage across ERM 18 and measuring the back EMF of ERM 18 while intermittently interrupting the output voltage across ERM 18 and then using the back EMF speed factor determined at 602.

At 612, the output voltage is adjusted proportionately if the actual ERM angular speed is different than the desired ERM angular speed. 608 and 610 are then repeated a finite number of times, or can be continuously repeated to always adjust to real time events. A haptic effect author can create a haptic effect as long or as short as he/she wants. The haptic effect is comprised of a series of regularly time-indexed values of voltage across the motor or, as with the disclosed embodiments, motor speed. Generally, haptic effects consist of 3-10 time-steps, and for ERMs each time-step lasts 5 ms in one embodiment. 608 and 610 are generally repeated until the end of the haptic effect is reached.

At 614, when it is time to adjust the ERM angular speed to the next speed, 608, 610 and 612 are repeated until there are no more angular speed steps. In one embodiment, the haptic effect specifies the initial output voltage and the target speed, in which case the functionality of 614 is not necessary.

As disclosed, embodiments use a measurement of the back EMF of an ERM actuator in order to characterize the particular ERM actuator and to optimize the haptic effects signals that are applied to the ERM in order to generate haptic effects. The measurement of the back EMF can be accomplished by measuring the voltage across the leads of the ERM, so additional measurement apparatuses are not needed in many embodiments to achieve the optimized results.

Figure 7:
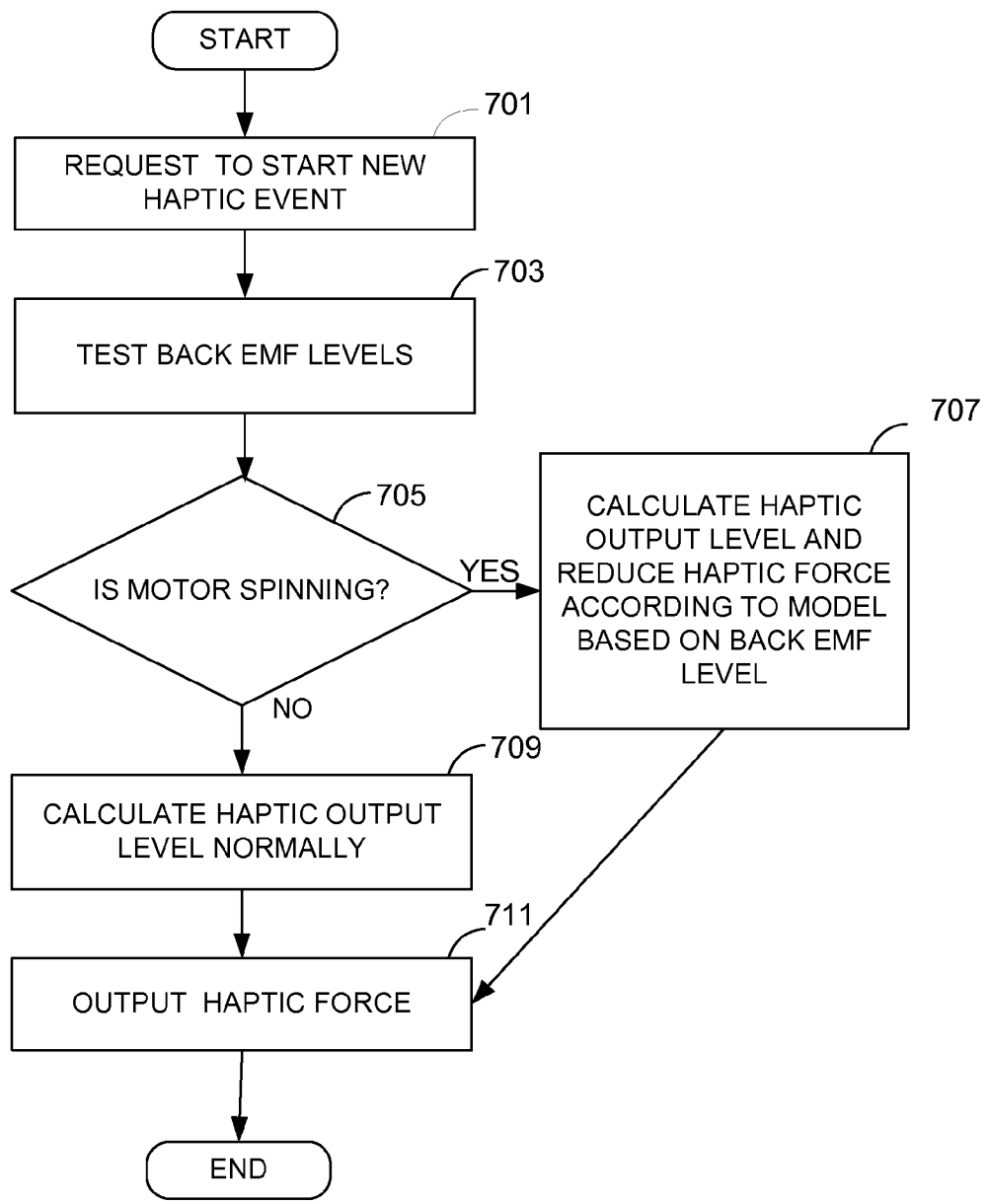
FIG. 7 is a flow diagram of the functionality of the ERM drive module when using back EMF to determine if the motor is spinning before generating haptic effects in accordance with one embodiment of the present invention.

In another embodiment, the back EMF can be used to determine if the motor is currently in motion before playing a new effect. This embodiment can compensate for an "effect" cascade, using a model to determine/estimate if a counterweight is currently in rotation (so static friction is already broken, has momentum) and requires a reduced input force to create the desired haptic effect. FIG. 7 is a flow diagram of the functionality of ERM drive module 22 when using back EMF to determine if the motor is spinning before generating haptic effects in accordance with one embodiment of the present invention.

At 701, a request to start a new haptic event is received.

at 703, the back EMF levels are tested.

At 705, based on the back EMF levels, it is determined whether the motor is spinning.

If yes at 705 (i.e., the motor is spinning), at 707 the haptic output level is calculated and the haptic force is reduced according to a model based on the back EMF level, as disclosed above.

If no at 705 (i.e., the motor is not spinning), at 709 the haptic output level is calculated normally.

At 711, the haptic force is output.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating a haptic effect on a device using an Eccentric Rotating Mass (ERM) actuator, the method comprising:
   determining a vibration level of the device during operation of the device;
   receiving a haptic effect signal comprising one or more parameters, wherein one of the parameters is a voltage amplitude level as a function of time;
   varying the voltage amplitude level based at least on vibration level; and
   applying the varied haptic effect signal to the ERM actuator.

2. The method of claim 1, wherein the device comprises an accelerometer that determines the vibration level.

3. The method of claim 1, further comprising:
   determining a back electromotive force (EMF) of the ERM actuator during operation of the device; and
   varying the voltage amplitude level based at least on the back EMF.

4. The method of claim 3, further comprising:
   determining a rise time of the ERM actuator using the back EMF; and
   varying the voltage amplitude level based at least on the rise time.

5. The method of claim 3, further comprising:
   determining a brake time of the ERM actuator using the back EMF; and
   varying the voltage amplitude level based at least on the brake time.

6. The method of claim 1, wherein the voltage amplitude level comprises an overdrive voltage.

7. The method of claim 3, further comprising:
   determining a relationship of an angular speed and the back EMF for the ERM actuator; and
   varying the voltage amplitude level based at least on the relationship.

8. The method of claim 3, further comprising:
   using the back EMF to determine if the actuator is spinning.

9. A method of generating a haptic effect on a device using an Eccentric Rotating Mass (ERM) actuator, the method comprising:
   determining by the device a back electromotive force (EMF) of the ERM actuator when the device is powered on;
   receiving a haptic effect signal comprising one or more parameters, wherein one of the parameters is a voltage amplitude level as a function of time;
   varying the voltage amplitude level based at least on the back EMF; and
   applying the varied haptic effect signal to the ERM actuator.

10. The method of claim 9, wherein the device comprises an accelerometer, further comprising:
    determining using the accelerometer a vibration level of the device when the device is powered on.

11. The method of claim 9, further comprising:
    determining a rise time of the ERM actuator using the back EMF; and
    varying the voltage amplitude level based at least on the rise time.

12. The method of claim 9, further comprising:
 determining a brake time of the ERM actuator using the back EMF; and
 varying the voltage amplitude level based at least on the brake time.

13. The method of claim 9, wherein the voltage amplitude level comprises an overdrive voltage.

14. The method of claim 9, further comprising:
 determining a relationship of an angular speed and the back EMF for the ERM actuator; and
 varying the voltage amplitude level based at least on the relationship.

15. A non-transitory computer readable medium having instructions stored thereon that, when executed by a processor, cause the processor to generate a haptic effect on a device using an Eccentric Rotating Mass (ERM) actuator, the generating comprising:
 determining a vibration level of the device during operation of the device;
 receiving a haptic effect signal comprising one or more parameters, wherein one of the parameters is a voltage amplitude level as a function of time;
 varying the voltage amplitude level based at least on vibration level; and
 applying the varied haptic effect signal to the ERM actuator.

16. The non-transitory computer readable medium of claim 15, wherein the device comprises an accelerometer that determines the vibration level.

17. The non-transitory computer readable medium of claim 15, the generating further comprising:
 determining a back electromotive force (EMF) of the ERM actuator during operation of the device; and
 varying the voltage amplitude level based at least on the back EMF.

18. The non-transitory computer readable medium of claim 17, further comprising:
 determining a rise time of the ERM actuator using the back EMF; and
 varying the voltage amplitude level based at least on the rise time.

19. The non-transitory computer readable medium of claim 17, further comprising:
 determining a brake time of the ERM actuator using the back EMF; and
 varying the voltage amplitude level based at least on the brake time.

20. The non-transitory computer readable medium of claim 15, wherein the voltage amplitude level comprises an overdrive voltage.

21. The non-transitory computer readable medium of claim 17, the generating further comprising:
 determining a relationship of an angular speed and the back EMF for the ERM actuator; and
 varying the voltage amplitude level based at least on the relationship.

22. The non-transitory computer readable medium of claim 17, further comprising:
 using the back EMF to determine if the actuator is spinning.

23. A non-transitory computer readable medium having instructions stored thereon that, when executed by a processor, cause the processor to generate a haptic effect on a device using an Eccentric Rotating Mass (ERM) actuator, the generating comprising:
 determining by the device a back electromotive force (EMF) of the ERM actuator when the device is powered on;
 receiving a haptic effect signal comprising one or more parameters, wherein one of the parameters is a voltage amplitude level as a function of time;
 varying the voltage amplitude level based at least on the back EMF; and
 applying the varied haptic effect signal to the ERM actuator.

24. The non-transitory computer readable medium of claim 23, wherein the device comprises an accelerometer, the generating further comprising:
 determining using the accelerometer a vibration level of the device when the device is powered on.

25. The non-transitory computer readable medium of claim 23, the generating further comprising:
 determining a rise time of the ERM actuator using the back EMF; and
 varying the voltage amplitude level based at least on the rise time.

26. The non-transitory computer readable medium of claim 23, the generating further comprising:
 determining a brake time of the ERM actuator using the back EMF; and
 varying the voltage amplitude level based at least on the brake time.

27. The non-transitory computer readable medium of claim 23, wherein the voltage amplitude level comprises an overdrive voltage.

28. The non-transitory computer readable medium of claim 23, the generating further comprising:
 determining a relationship of an angular speed and the back EMF for the ERM actuator; and
 varying the voltage amplitude level based at least on the relationship.

* * * * *